United States Patent [19]
Nguyen et al.

[11] Patent Number: 6,105,015
[45] Date of Patent: Aug. 15, 2000

[54] WAVELET-BASED HYBRID NEUROSYSTEM FOR CLASSIFYING A SIGNAL OR AN IMAGE REPRESENTED BY THE SIGNAL IN A DATA SYSTEM

[75] Inventors: Chung T. Nguyen, Bristol; Sherry E. Hammel, Little Compton; Kai F. Gong, Pawtucket, all of R.I.

[73] Assignee: The United States of America as represented by the Secretary of the Navy, Washington, D.C.

[21] Appl. No.: 08/802,573

[22] Filed: Feb. 3, 1997

[51] Int. Cl.$^7$ ...................................................... G06F 15/18
[52] U.S. Cl. ................................ 706/26; 706/15; 706/20; 706/22
[58] Field of Search ............................... 342/90; 375/367; 702/76; 395/24

[56] References Cited

U.S. PATENT DOCUMENTS

| | | | |
|---|---|---|---|
| 4,906,940 | 3/1990 | Greene et al. | 382/100 |
| 5,124,930 | 6/1992 | Nicolas et al. | 702/76 |
| 5,504,487 | 4/1996 | Tucker | 342/90 |
| 5,504,787 | 4/1996 | Zscheile, Jr. et al. | 375/367 |
| 5,612,700 | 3/1997 | Tucker | 342/90 |

OTHER PUBLICATIONS

Henry Campbell Black, Black's Law Dictionary: Sixth Edition, West Publishing Co., St. Paul, Minnesota, Jan. 1, 1990.

Merriam–Webster's Collegiate Dictionary: Tenth Edition, Merriam–Webster, Incorporated, Springfield, MA, Jan. 1, 1997.

*Primary Examiner*—Tariq R. Hafiz
*Assistant Examiner*—Wilbert L. Starks, Jr.
*Attorney, Agent, or Firm*—Michael J. McGowan; Michael F. Oglo; Prithvi C. Lall

[57] ABSTRACT

The present invention relates to a system and a method for signal classification. The system comprises a sensor array for receiving a series of input signals such as acoustic signals, pixel-based image signal (such as from infrared images detectors), light signals, temperature signals, etc., a wavelet transform module for transforming the input signals so that characteristics of the signals are represented in the form of wavelet transform coefficients and an array of hybrid neural networks for classifying the signals into multiple distinct categories and generating a classification output signal. The hybrid neural networks each comprise a location neural network for processing data embedded in the frequency versus time location segment of the output of the transform module, a magnitude neural network for processing magnitude information embedded in the magnitude segment of the output of the transform module, and a classification neural network for processing the outputs from the location and magnitude neural networks. A method for processing the signal using the system of the present invention is also described.

9 Claims, 5 Drawing Sheets

WAVELET-BASED HYBRID NEUROSYSTEM FOR CLASSIFYING A SIGNAL OR AN IMAGE REPRESENTED BY THE SIGNAL IN A DATA SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATION

The present invention is related to co-pending U.S. Patent Application entitled HYBRID NEURAL NETWORK FOR PATTERN RECOGNITION, (Navy Case No. 78001) having the same filing date.

BACKGROUND OF THE INVENTION (1) Field of the Invention

The present invention relates to a neurosystem and to a method for signal classification whose structures are a-priori known and which is especially useful in fields of utility in which economy of computational burden, accuracy of classification, or ease of accommodating additional signals to be classified are critical factors in choice of design.

(2) Description of the Prior Art

Signal classification involves the extraction and partition of features of targets of interest. In many situations, the problem is complicated by the uncertainty of the signal origin, fluctuations in the presence of noise, the degree of data correlation in multi-sensor systems, and the interference of nonlinearities in the environment. Research and studies in the past have focused on developing robust and efficient methods and devices for recognizing patterns in signals, many of which have been developed from traditional signal processing techniques, and known artificial neural network technology.

Figure 1:
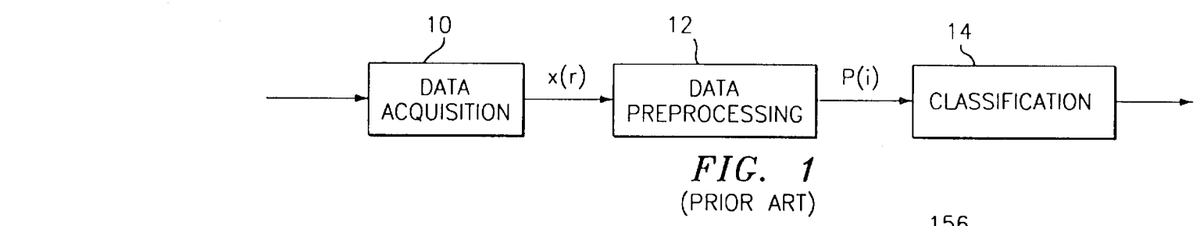
FIG. 1 is a schematic representation of a prior art pattern recognition system.

FIG. 1 is a schematic representation of a conventional pattern recognition system. In this configuration, the system consists of three phases: data acquisition 10, data preprocessing 12, and decision classification 14. In the data acquisition phase 10, analog data from the physical world are gathered through a transducer and converted to digital format suitable for computer processing. In this stage, the physical variables are converted into a set of measured data, indicated in FIG. 1 by electric signals, x(r), if the physical variables are sound (or light intensity) and the transducer is a microphone (or photocells). The measured data is used as inputs to the second phase 12 (data preprocessing) and is grouped into a set of characteristic features, P(i), as output to third phase 14. The third phase 14 is actually a classifier or pattern recognizer which is in the form of a set of decision functions. Based on the distinction of feature characteristics in P(i), the classifier in this phase will determine the category of the underlying signals.

Signal classification or pattern recognition methods are often classified as either parametric or nonparametric. For some classification tasks, pattern categories are known a priori to be characterized by a set of parameters. A parametric approach is to define the discriminant function by a class of probability densities with a relatively small number of parameters. Since there exist many other classification problems in which no assumptions can be made about these parameters, nonparametric approaches are designed for those tasks. Although some parameterized discriminant functions, e.g., the coefficients of a multivariate polynomial of some degree are used in nonparametric methods, no conventional form of the distribution is assumed.

In recent years, one of the nonparametric approaches for pattern classification is neural network training. In neural network training for pattern classification, there are a fixed number of categories (classes) into which stimuli (activation) are to be classified. To resolve it, the neural network first undergoes a training session, during which the network is repeatedly presented a set of input patterns along with the category to which each particular pattern belongs. Then later on, a new pattern is presented to the network which has not been seen before but which belongs to the same population of patterns used to train the network. The task for the neural network is to classify this new pattern correctly. Pattern classification as described here is a supervised learning problem. The advantage of using a neural network to perform pattern classification is that it can construct nonlinear decision boundaries between the different classes in nonparametric fashion, and thereby offers a practical method for solving highly complex pattern classification problems.

The discrete Fourier transform (DFT) has had a great impact on many applications of digital signal processing. Not only does the DFT provide data decorrelation, but it also greatly reduces the computational requirements. A standard approach for analyzing a signal is to decompose it into a sum of simple building blocks. The fast Fourier transform (FFT) and discrete cosine transform (DCT) are the most well-known examples. However, once the basis vector formed by the Fourier kernel function is a cosine basis, it does not have compact support or finite energy. Thus, a large number of transform coefficients are required to retain a significant fraction of the total signal energy.

In the past several decades, signal characterizations have been mainly performed with traditional spectral processing such as the DFT and FFT. Signal characteristics are represented by frequency information. Based on its frequency function, or spectral information, the signal is modeled for analyzing and processing. However, Fourier transform outputs do not contain information in the time domain. Critical details of the signal as it evolves over time are lost. Therefore, difficulty arises in processing the data, especially if the data is nonstationary or nonlinear. Recently, wavelets and wavelet transforms have emerged as a useful alternative for many applications in signal processing. Since their basis functions have compact support and their transforms have good localization in both time and frequency domains, wavelets have opened up new avenues for improving signal processing. By a wavelet transform of a given function g(t), one can represent the function as follows:

$$g(t) = \sum_n \sum_k C_{nk} \upsilon_{nk}(t) \qquad (1)$$

where n and k are integer indexes and the $\upsilon_{nk}$ are the coefficients. Each of the functions $\upsilon_{nk}(t)$ belongs to one of a finite number of families $\{\upsilon_{nk}(t)\}$, and the parameters n and k are related to the frequency scale and time location of this function.

Despite these advances, there still remains a need however for systems and methods of pattern classification which perform at a high level.

SUMMARY OF THE INVENTION

Accordingly, it is an object of the present invention to provide an artificial neural network-based system and method for signal classification, or pixel-based image classification, which is economical in computation burden.

It is another object of the present invention to provide a system and method as above which is highly accurate in its performance of signal classification.

It is still another object to provide a system and method above whose capcity for number of distinct signals undergoing classification may be simply and inexpensively increased.

The foregoing objects are attained by the system and the method of the present invention.

In accordance with the present invention, a system for signal classification broadly comprises: one or more sensors for receiving signals (including pixel-based image signals); means for transforming the input signals so that characteristics or features of the signals are represented in the form of wavelet transform coefficients; and means for classifying said signals into multiple distinct categories and generating a classification output signal. The transforming means comprises a wavelet transform module for which an operator can specify the number of selected coefficients for processing and the basis kernel function for the wavelet transformation. The classifying means in a preferred embodiment comprises an array of hybrid neural networks with each network having a location neural network, a magnitude neural network, and a classification neural network. Preferably, the location and magnitude neural networks are one-layer neural networks which are trained using an unsupervised training algorithm. The classification networks are preferably a two-layer neural network which are trained using a supervised training algorithm.

The method of the present invention broadly comprises receiving a series of input signals, transforming the input signals so that characteristics of the signals are represented in the form of wavelet transform coefficients, and classifying the signals into multiple distinct categories and generating a classification output signal.

The system and method of the present invention represent a novel system and method for efficient signal classification based upon wavelet transform characteristics of the acoustic signals using an artificial neural system with a hybrid architecture that employs components utilizing different types of neural networks training algorithms.

Other details of the system and method of the present invention, as well as other objects and advantages, are set forth in the following detailed description and the accompanying drawings wherein like reference numerals depict like elements.

DESCRIPTION OF THE PREFERRED EMBODIMENT

Figure 2:
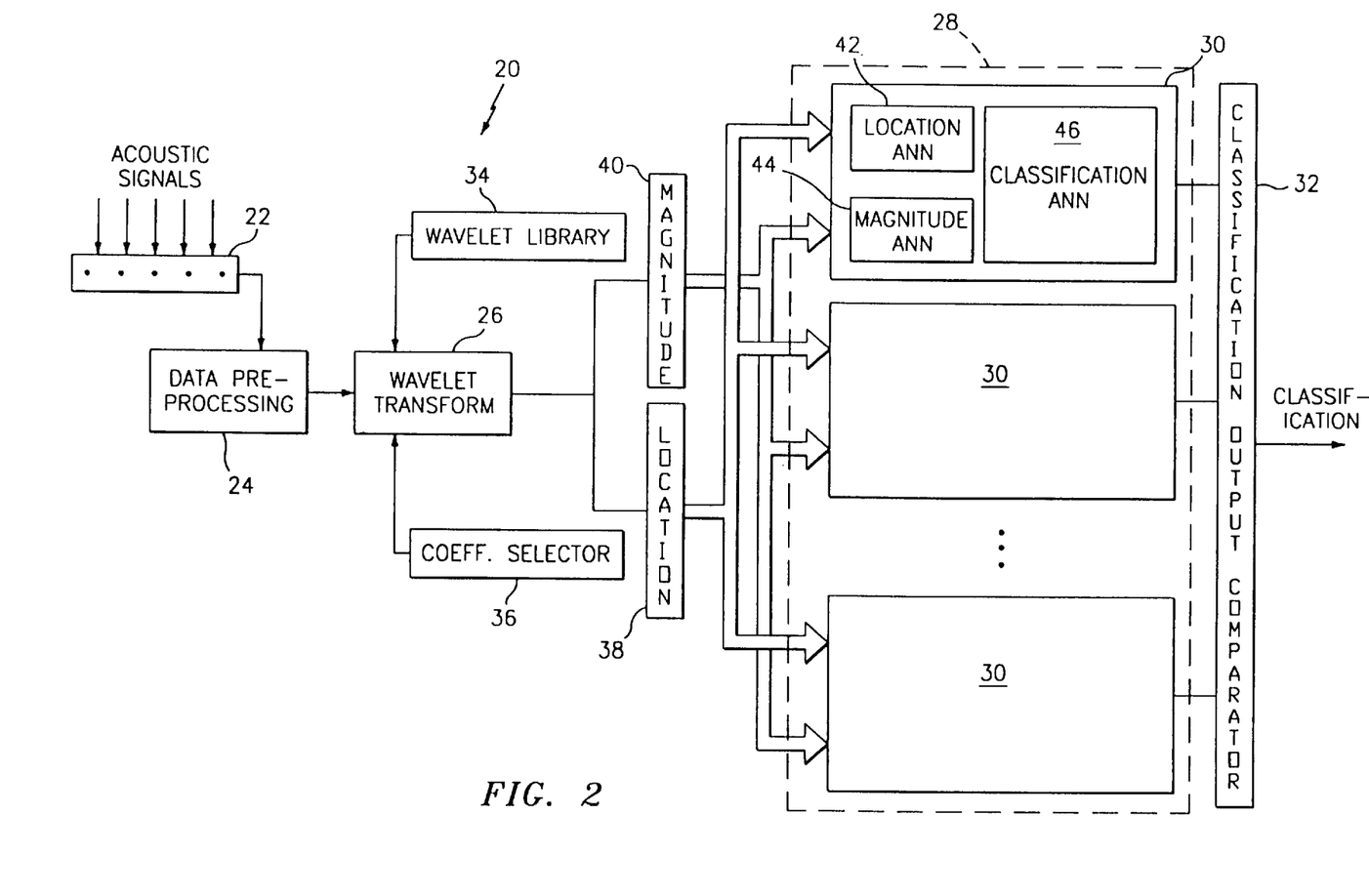
FIG. 2 is a schematic representation of a wavelet-based hybrid neurosystem signal classifier system in accordance with the present invention.

Referring now to the drawings, FIG. 2 illustrates the architecture of a wavelet based hybrid neurosystem signal classifier system 20 in accordance with the present invention. As shown therein, the system 20 consists of a signal receiver module 22, a data preprocessing module 24, a wavelet transform module 26, an array 28 of parallel hybrid multi-component neural network systems 30, and a classification output gate or comparator 32.

The signal receiver module 22 comprises one or more sensors (e.g., the more than one sensor being in the form of an array of spatially distributed sensors)for input signals of various forms including single hydrophone produced acoustic signals, acoustic signal produced by a spatially distributed array of hydrophones, pixel-based infra image signals, light signals, or temperature signals. The acoustic signals received by the sensors are digitized in a known manner preferably in the module 22. The digitized signals are then forwarded to the data preprocessing module 24.

Figure 2A:
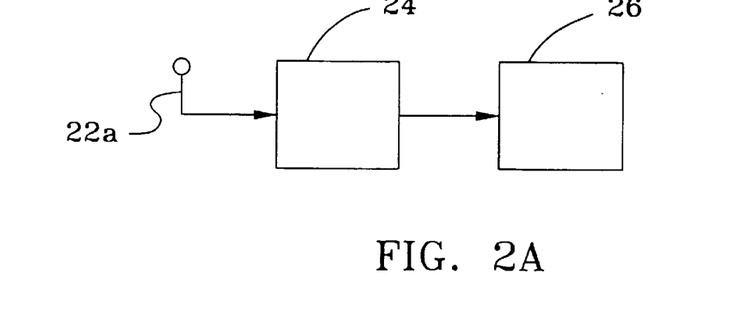
FIGS. 2A, 2B and 2C are schematics illustrating a diversity of forms of receiving means 22, FIG. 2.
Figure 2B:
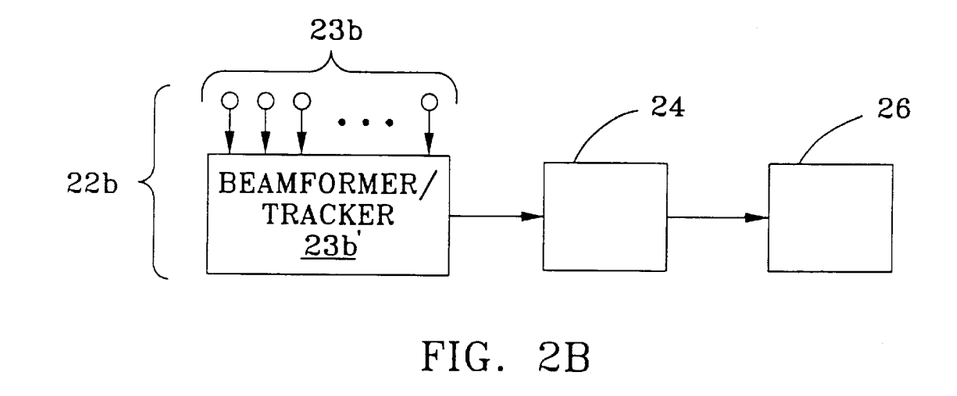
Figure 2C:
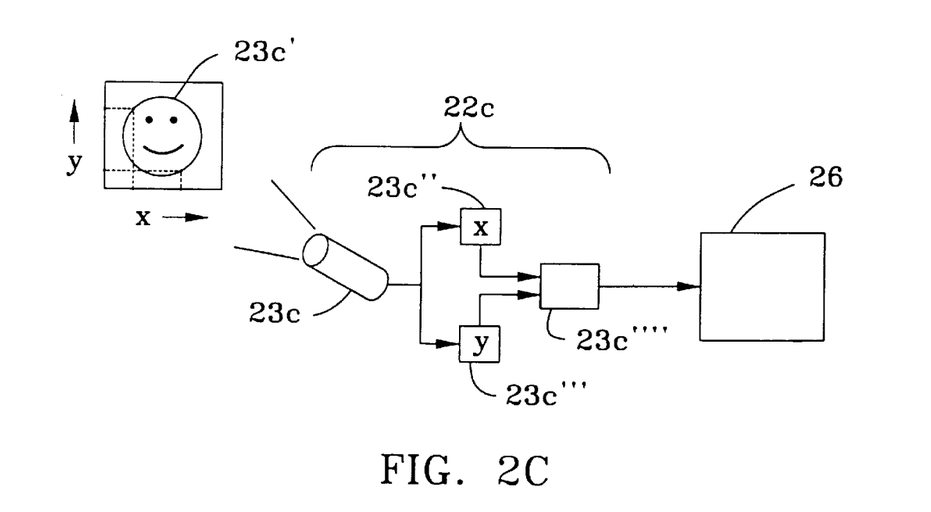

As stated above, receiver module may take a diversity of forms. However, it is to be appreciated that in accordance with the present invention each of of these diverse forms is adapted to provide the information which it gathers in the form of serial train of spatially coordinated information components. Referring to FIG. 2A, which represents the case of the sensor of signal receiving means 22 being (FIG. 1) being embodied as a singly acting hydrophone 22a, the signal which the receiving means provides would simply be a train of sampled and digitized representations of the amplitude of the acoustic signal that impinge upon the hydrophone. Referring to FIG. 2B, the input of the of a receiving means 22b may alternative be embodied as an array 23b of spatially separated hydrophones, such as a towed array of hydrophones used in undersea warfare sonar systems. The signals for the individual hydrophones of the array are conventionally processed by sonar beamformers or sonar trackers which provide either a signal train having 1-dimension (e.g., towed array output representing the conical angle bearing of the contact relative to the axis of the towed array) or a signal train having 2-dimensions (e.g., the density function of a conical scan stepped through 180° about the towed array axis in small increments). In the latter 2-dimensional case, a conventional beamformer/tracker, 23b' provides the signal to preprocessing module 24, and in turn to wavelet transform module 26, in the form of a serial signal train in which the increments scan information components are spatially coordinated. Referring now to FIG. 2C, in another alternative embodiment the input of a receiving means may be a pixel-based photoelectrical camera 23c, which in viewing an image 23c' accumulates and stores the image as a series of pixels whose 2-dimensional locations are determined by Cartesian x and y scan circuits 23c'' and 23c'''. By means of a suitable muliplexing type circuit 23c'''' the x-y position information is translated into a serial signal train in which the x and y pixel location information is spatially coordinated before passing to the wavelet transform module 26 (in this case the noise/segmentation circuity 24 may be omitted).

Data preprocessing module 24 may comprise any suitable means known in the art for carrying out noise reduction and data segmentation. The data preprocessing module 24 may be formed by a computer, or a portion of a computer, which has been preprogrammed to carry out the desired processing of the digitized acoustic signals. Any suitable algorithms known in the art may be used to process the digitized signals in a desired manner. The output from the data preprocessing module 24 is then fed to the wavelet transform module 26.

The wavelet transform module 26 transforms the preprocessed signals so that the signal characteristics or features in each segment of the underlying signal are represented in the forms wavelet transform coefficients. It has been found that the information contained in the wavelet coefficients reflects the signal's features in both time and frequency domains. The wavelet transform module preferably comprises a processor programmed to transform the preprocessed digitized signals into a set of wavelet transform coefficients, which typically will be a parallel type processor. The particular programming used in the processor does not form part of the present invention. In fact, any suitable wavelet transformation algorithms known in the art may be used in the module 26. Standard wavelet functions, such as the Daubechie series of functions are available with a repertoire of so-called "basis kernel functions" which are matchable to corresponding harmonic characteristics of the input. When performing the wavelet transform, the operator specifies an appropriate kernel function via a wavelet library 34. The operator also specifies the number of selected coefficients for processing via a coefficient selector module 36. Coefficient selector 36 enables the operator to select a portion of the waveform transform processor's total coefficient producing capacity (ranked starting with the largest magnitude of coefficient appearing in the output and decreasing in a monotonical sequence with respect to coefficient magnitude therefrom) to represent a signal. This in turn enables tailoring operation of module 26 to operate with an economy of processing resources matched to the needs of the characteristics of input signals. In accordance with well known principles, a wavelet transform processor 26, FIGS. 2 and 5 produces a data output representing the portion of wavelet coefficients chosen per the operator's selection made using selector 36. This output takes the form of a cluster of data representing the selected coefficients having the frequency versus time location, and the magnitude information, associated with each wavelet coefficient embedded in the data cluster. A location information databus 38 and a magnitude information databus 40 are operatively connect to the output of the processor 26 such that they respectively tap the location and magnitude information regarding the selected coefficients. The location of the coefficients in time and frequency domain is may be directly tapped by databus 38. Reindexing, may be necessary in tapping the magnitude of each coefficient. The properties of the coefficients, namely, the location and magnitude of each wavelet are coupled to array 28 of hybrid multi-component neural network systems 30 via location databus 38 and magnitude databus 40, respectively. More particularly databus 38 and 40 separately pass the location and magnitude coefficients to the location and magnitude artifical neural networks 42 and 44, in each hybrid multi-component neural network system 30. It is to be appreciated that the above described production of location and magnitude properties and the technology of applying them to succeeding stages in a processing system via a data bus are well known.

The hybrid neurosystem 28 comprises an array of multiple hybrid multi-component neural network systems 30. Any desired number of neural network systems 30 may be used in the array. In the hybrid neurosystem 28, signals are classified into multiple distinct categories corresponding to their wavelet transform characteristics. Each hybrid multi-component neural network systems 30, as shown in FIG. 2, consists of a location artificial neural network 42, a magnitude artificial neural network 44, and a classification artificial neural network 46. As will be discussed in more detail hereinafter, the location and magnitude neural networks 42 and 44 are each one-layer networks known as feature extraction networks and the classification neural network 46 is a two layer network. The networks 42 and 44 in effect each generate "topological" maps of the signal feature(s) being processed, which topological maps are in effect supplied to classification network 46. Categorization of the signal is performed by each hybrid neural network 30 based on a certain set of wavelet transform features recognized by the distribution of Synaptic weights or "topological maps". Stated another way, wavelet transform features intrinsic to each category of signal being classified are recognized by distribution of the synaptic weights in artificial neural networks 42 and 44 of each hybrid neural networks 30. This distribution of weights arises as the result of the unsupervised learning process to which network 42 and 44 are subjected. The distribution of the synaptic weights within networks 42 and 44 are the physical manifestations of the aforesaid topological maps.

The classification outputs from the classification neural network 46 are put into a global context for an end user in the classification output comparator gate module 32. Module 32 is operative to compare the magnitudes of outputs at the classification neural network 46 of each hybrid multi-component neural network systems 30 one to another, and to pass only the output of the single system 30 whose output is largest. The implementation of this function (i.e., of module 32) in software or hardware is within the skill of the art. At this final stage, the classification output is compared against a preset threshold value, for example a value of 0.5. If the output is greater than the threshold level, classification is declared; otherwise no classification is made. These results may be displayed to the operator in any suitable fashion.

Figure 5:
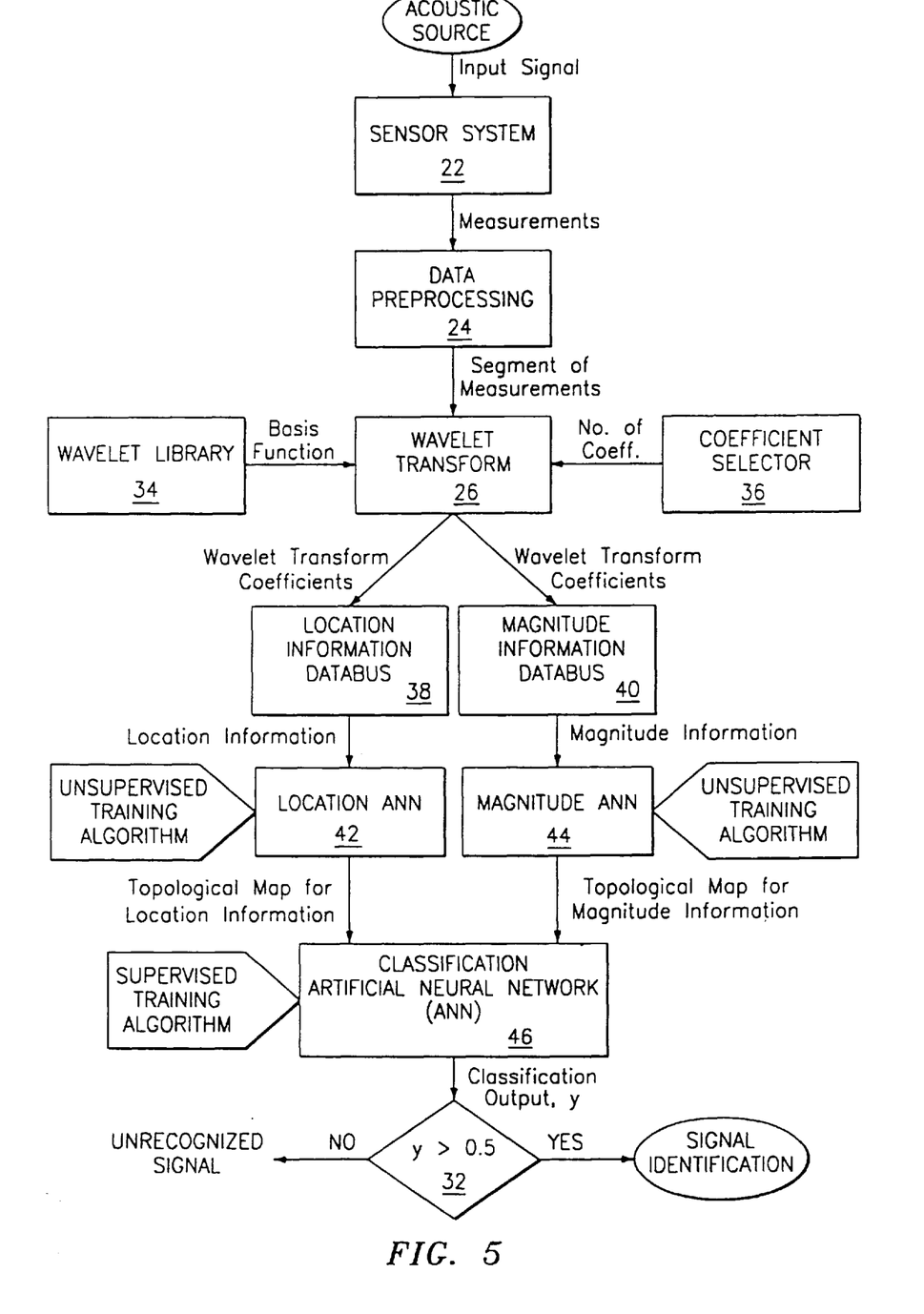
FIG. 5 is a flow chart illustrating the operation of the wavelet based hybrid neurosystem signal classifier system of FIG. 2.

FIG. 5 is a flow chart illustrating the operation of the wavelet-based hybrid neurosystem of the present invention. The foregoing method of operation is illustrated in this figure.

Figure 3:
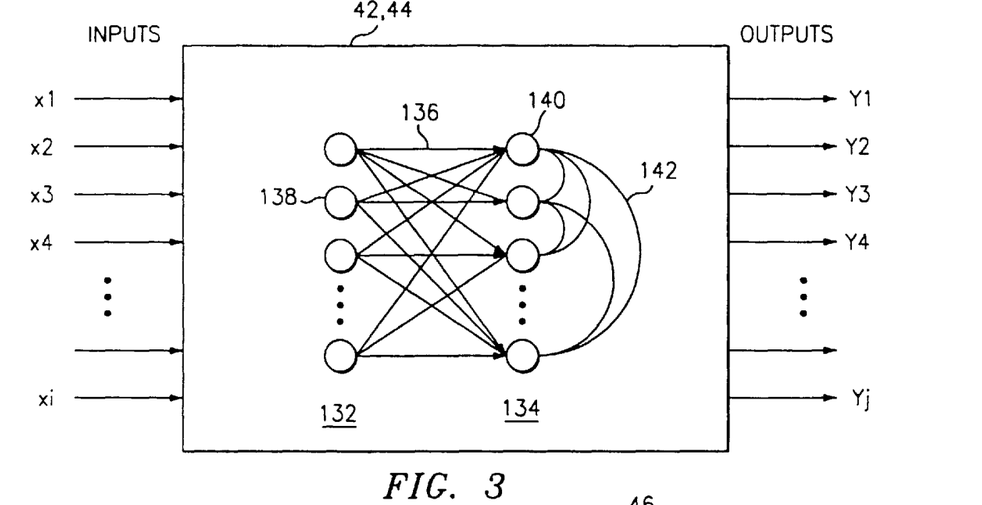
FIG. 3 is a schematic representation of the architecture of the location/magnitude neural networks used in the system of the present invention.

Referring now to FIG. 3, one can see the architecture of the location artificial neural network 42, which architecture is identical to that of the magnitude artificial neural network 44. As shown in this figure, the location artificial neural network 42 has an input layer 132 formed by a plurality of input layer neurons 138 and an output layer 134 formed by a plurality of output layer neurons 140 with synaptic feedforward (excitatory) connections 136 from the input layer neurons 138 to the output layer neurons 140 and lateral (inhibitory) connections 142 among neurons 140 in the output layer 134. The stream of location information data flowing along location databus 38 is applied to in parallel to all the input neurons 138. Preferably, each output neuron 140 is fully connected to all of the input neurons 138. The input neurons 138 in the input layer 132 receive input signals x1–xi (i.e., all receive the same input signal at a given instants, which is the location information fed from location databus 38, where i equals the number of input neurons 138. The output neurons 140 generate outputs y1 through yi, where i equals the number of output neurons. In the network 42, as well as the network 44, the neuron cells at the output layer compete in their activities by means of mutual lateral interactions and develop adaptively into specific detectors of different signal patterns through an unsupervised learning process. In one embodiment of the present invention, each network 42 and 44 consist of 100 neurons (50 input neurons and 50 output neurons).

Each of the neural networks 42 and 44 is designed so that at a given time only one cell or a local group of cells gives an active response to the current input. As a result, the locations of the responses tend to become ordered as if meaningful coordinate systems for different input features were being created over the network. The spatial location of a cell in the network corresponding to a particular domain of signal patterns provides an interpretation of the input information.

A set of competitive learning rules based on the Kohonen algorithm may be used to train each of the neural networks 42 and 44. Such a training scheme is described in the above-identified co-pending patent application, filed on an even date herewith (Navy Case No. 78001), which is hereby incorporated by reference.

Training data for the unsupervised training of the location and magnitude artificial neural networks 42 and 44 is introduced at the acoustic signal input of the sensor module 22. The training data may consist of location data and magnitude data derived from samples of raw, noisy, acoustic signals for a variety of speed, direction and sea noise conditions, for a given target type of the target types that the system is being trained to recognize. Thus, the training process uses the full structure of the system shown in FIG. 2. The number of samples used to train an early version of the system was 744. Any number between 500 and 1000 is believed to be sufficient. The number of samples used for testing was 380. Any number of test samples between 200 and 500 is believed to be sufficient.

Figure 4:
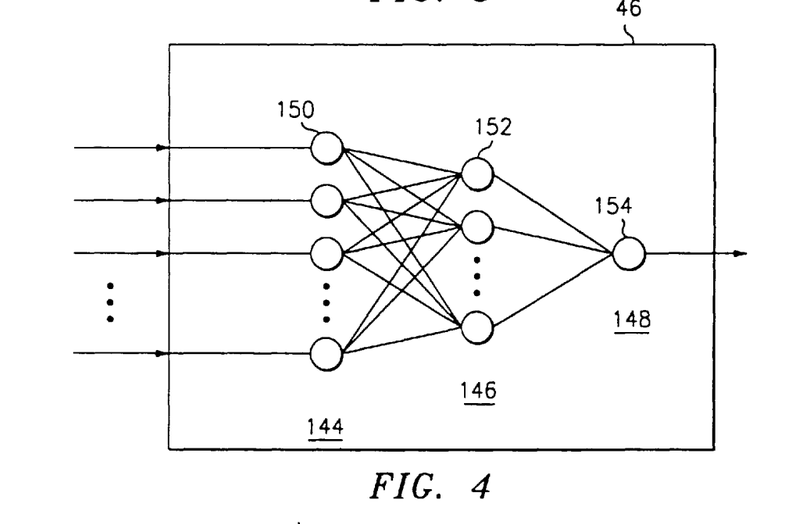
FIG. 4 is a schematic representation of the architecture of the classification neural network used in the system of the present invention.

The architecture of the classification neural network 46 is shown in FIG. 4. As shown therein, the neural network 46 may be a standard two-layer, fully connected feedforward network whose architecture may be termed a multilayer perceptron configuration. There are three layers: an input layer 144 formed by a plurality of input neurons 150, a hidden layer 146 formed by a plurality of neurons 152 and output layer 148 formed by one output neuron 154. In one embodiment the input layer 144 is constructed with 100 input neurons with each input neuron 150 receiving information from a corresponding output neuron 140 of the networks 42 and 44. The number of input neurons 150 which are provided equals the number of output neurons of the associated location neural network 42 plus the number of output neurons of the associated magnitude neural network 44 (e.g., 50 plus 50=100). Each output neuron of neural networks 42 (i.e., having output neurons 140) and 44 (output neurons not shown) is coupled to a respective one of the input neurons 150 of classification neural network. The hidden layer is preferably constructed of 20 neurons. The classification neural network 46 is a dedicated input neural network as opposed to the conventional Lippman fully connected neural network.

The system of the present invention uses conventional back propagation artificial neural network (ANN) training to train the classification neural network 46. One back propagation training algorithm which may be used to train the classification neural network 46 is described in the above-identified co-pending U.S. patent application, filed on an even date herewith, (N.C. 78001), which is incorporated by reference in its entirety herein.

During training, samples of acoustic data from a recording of a particular target type are repeatedly fed to the sensor system 22, causing characteristic magnitude and location patterns to appear at the inputs of the classification neural network 46.

In the system and method of the present invention, any suitable wavelet function may be used to transform the underlying signal in the module 26. In a preferred embodiment, wavelet functions Daubechies 2, 4, 6, 8, and 12 are used.

Figure 6:
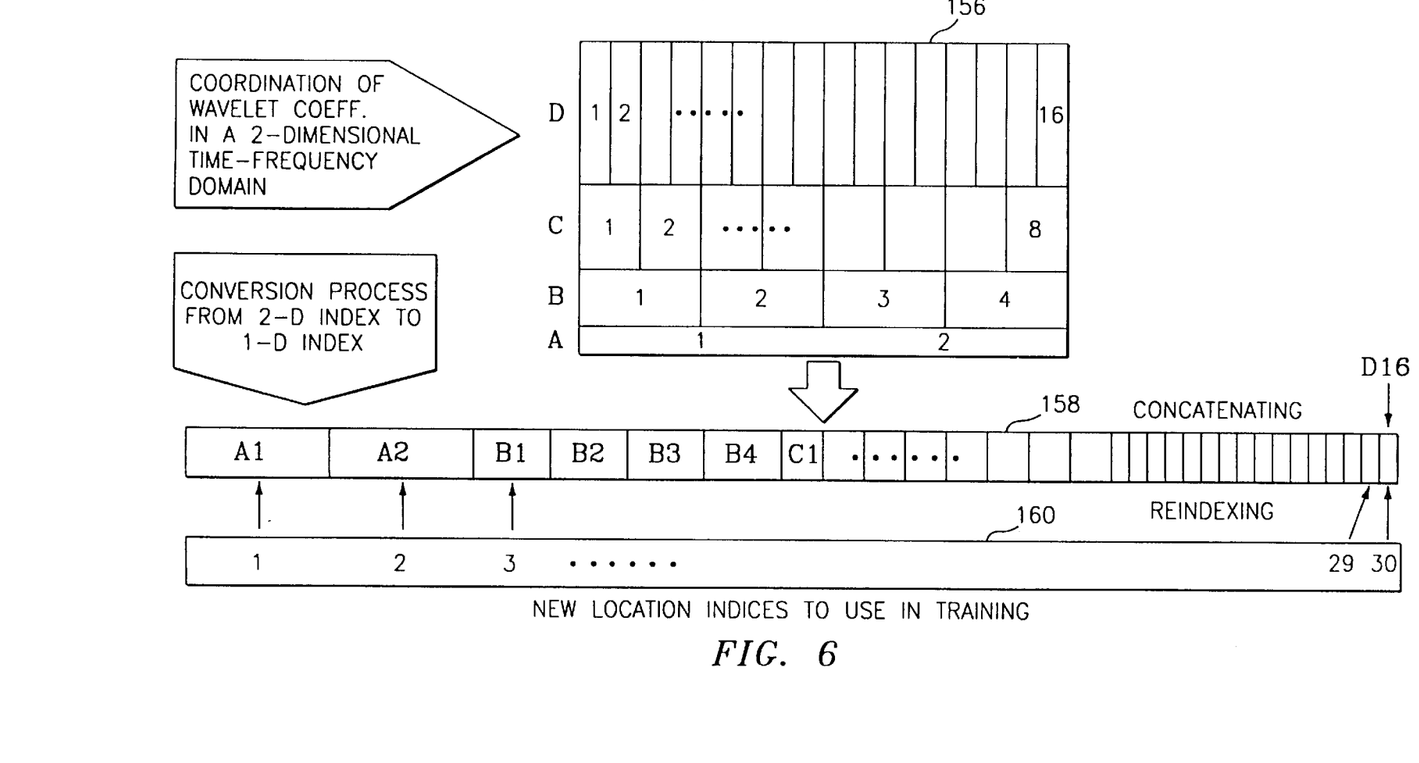
FIG. 6 illustrates the conversion process from 2-D indexing to 1-D indexing.

The cluster of Wavelet coefficient data from may be stored from wavelet transform processor may be stored in a storage device (no shown) for use in the artificial neural networks. More specificationally they may be stored in the 2-dimensional time versus frequency domain matrix 156, FIG. 6 (in which the ordinate is frequency and the absissa is time) well known to those of skill in the wavelet function art. As noted above, the tapping of the embedded location information by time-positions of databus 38, FIGS. 2 and 38 for feeding location information to artificial neural networks 42, is straight forward. One illustrative technique for tapping the magnitude information from this matrix includes forming a ordered concatenated string 158 of the magnitude information, and then reindexing this into the uniform time-positions of databus 40, which reindexing is diagrammatically represented by the arrows indicating assignment of databus position index integers contained in box 160 to the concatenation positions in string 158. Any other suitable mechanism for effecting a translation of a 2-dimensional data matrix to two 1-dimensional databus position may be used as an alternative.

Figure 7:
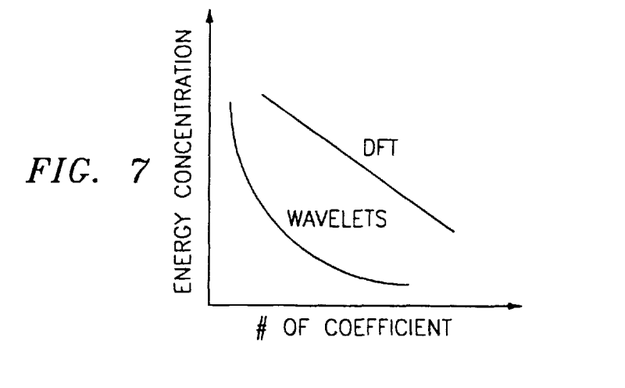
FIG. 7 illustrates the relative efficiency of the system of the present invention.

The location neural network 42 combines what otherwise would be a frequency neural network and a time neural network and thereby improves efficiency. Although three items of data (frequency, time and magnitude) are being processed, only two artificial neural networks are used to accomplish the feature extraction. This configuration in combination with the use of wavelet transforms approaches the efficiency of a Quad Mirror Filter (QMF) as shown in FIG. 7.

The combination of wavelet and wavelet transform, hybrid neural network architecture, and advanced training algorithms in the design makes the system of the present invention unique and provides high classification performance. In particular, signal transformation with wavelet, and principal component analysis for selecting wavelet coefficients, provide efficiency in feature extraction with relatively less computational expenses. Further, hybrid neural networks with their feature of a self-organizing feature topological map produces a high classification accuracy. In self-organizing systems, the use of computational maps offer a number of advantages as follows.

The present invention affords an advantage of high information processing efficiency. The hybrid neurosystem is required to analyze and classify complex signals arising in a dynamic environment on a continuous basis. This, in turn, requires the use of processing strategies that permit the rapid handling of large amount of information. Computational topological maps provided by the self-organizing systems are ideally suited for this task. In particular, computational maps represent the results obtained from complex stimuli in a simple and systematic form.

Further the present invention afford an advantage of simplicity of access to process information. That is to say the use of computational maps simplifies the schemes of connectivity required to utilize the information by the classification network. An important by-product of this advantage is that the capcity of system 20, in terms of the number of distinct signals it will handle, may be simply and inexpensively increased. a channel for a new signal to undergo classification may be added by simply adding another hybrid multi-component neural network system 30 in parallel with the already provided array 28 of systems 30. Training the new system (unsupervised training of is location and magnitude neural networks 42 and 44 and supervised training of its classification neural network 46) to provide a classification output response for the new signal requires only the same increment of effort as had been required for the existing signal observation channels.

Still further, the present invention affords an advantage of a common form of representation. More specifically, the common, mapped representation to the results of different kinds of computations permits the classification network to employ a single strategy for pattern recognition.

While the invention has been described in combination with specific embodiments thereof, it is evident that many alternatives, modifications, and variations will be apparent to those skilled in the art in light of the foregoing description. For example, if recognition of only a single known structure of input signal is desired, the location and magnitude information need only be fed (via data buses 38 and 40) to a single hybrid multi-component neural network systems 30)and system 20 will only perform a function of indicating presence of the single input signal structure. Accordingly, it is intended to embrace all such alternatives, modifications, and variations as fall within the spirit and broad scope of the appended claims.

What is claimed is:

1. A system for signal classification comprising:

means for receiving a series of input signals;

means for transforming said input signals so that characteristics of said signals are represented in the form of wavelet transform coefficients;

means for classifying said signals into at least one distinct category and generating a classification output signal indicative of presence of a distinct category of said at least one category;

means for allowing an operator to specify a basis kernel function for said wavelet transformation; and means for allowing said operator to specify a selected portion of the coefficients to be processed by the means for classifying and generating an output signal, starting with the largest magnitude of coefficient and proceeding with other coefficients in monotonically descending order of magnitude.

2. The system of claim 1 further comprising:

means for comparing the classification output signal from said classifying means to a threshold value to determine whether said classification output signal should be accepted.

3. A system for signal classification comprising:

means for receiving a series of input signals;

means for transforming said input signals so that characteristics of said signals are represented in the form of wavelet transform coefficients;

means for classifying said signals into at least one distinct category and generating a classification output signal indicative of presence of a distinct category of said at least one category;

said classifying means comprising at least one hybrid multi-component neural network system; and each hybrid multi-component neural network system comprising a set of a first location feature, neural network and a second magnitude feature, neural network, and a third classification neural network, the outputs of the set of feature neural networks being parallel fed to the classification neural network.

4. The system of claim 3 including a plurality of at least 2 hybrid multi-component neural network systems; and a gate operative to monitor the outputs of the classification neural network of each hybrid multi-component neural network system and to pass only the output which is largest on magnitude.

5. The system of claim 3 wherein each neural network of each set of location and magnitude feature neural networks is of the type having feed forward connections from a plurality of input neurons to a plurality of output neurons and all the are laterally connected one to another, output neurons and said third classification neural network is of the type having an input, a hidden and a single output layer with full feed forward connections therebetween.

6. The system of claim 3 wherein:

a first 2-dimensional frequency versus time location feature characteristic and second magnitude feature characteristic of said wavelet transform coefficients being coupled to the first and second neural networks, respectively; and the outputs of the first and second feature neural networks being coupled to input of the third neural network.

7. The system of claim 6 including a plurality of at least 2 hybrid multi-component neural network systems wherein:

the location and magnitude feature characteristics are coupled to each input neuron of each of the respective ones of the first and second neural networks of the hybrid system over a distinct parallel input path leading to each individual input neuron;

each third neural network of includes first and second sets of input neurons corresponding in number to the output neurons of the first and second neural networks; and said output neurons of each first and second neural network being coupled to said first and second sets of input neurons of the third neural network over a distinct parallel input path leading to each individual input neuron.

8. The system of claim 3 wherein:

the set of first and second neural network of one of said least one hybrid neural network systems has undergone a first sequential phase of unsupervised training including the application to the input of each set a predetermined distinct category of signal to establish a set of first and second topologies of distribution of synaptic weights of the neurons respectively within the first and second neural networks, which set of topologies are uniquely predetermined characteristic of the category of signal; and the third neural network of said one hybrid neural network system has undergone a sequential second phase of training including the application to the inputs of the first and second neural networks of said predetermined category of signal to train the third neural network to respond to the outputs which the first and second topologies cause to be present at the output of the first and second neural network, to thereby in post training operation produce a signal indicative of presence of the predetermined category of signal at the output of the third neural network.

9. The system of claim 8 wherein said first sequential phase of training employs a training algorithm generally of the Kohenen type, and said second (sequential phase of training employs a training algorithm generally of the back propagation type.

* * * * *